United States Patent
Yamaguchi et al.

(10) Patent No.: US 6,726,524 B2
(45) Date of Patent: Apr. 27, 2004

(54) TRAVELING STRUCTURE

(75) Inventors: Shinji Yamaguchi, Kanagawa (JP);
Shinichi Asai, Kanagawa (JP)

(73) Assignee: Kyosho Corporation, Tokyo (JP)

( * ) Notice: Subject to any disclaimer, the term of this patent is extended or adjusted under 35 U.S.C. 154(b) by 23 days.

(21) Appl. No.: 10/219,945

(22) Filed: Aug. 16, 2002

(65) Prior Publication Data

US 2003/0040253 A1 Feb. 27, 2003

(30) Foreign Application Priority Data

Aug. 24, 2001 (JP) ......................... 2001-254450

(51) Int. Cl.[7] .................. A63H 17/00; A63H 17/26
(52) U.S. Cl. .................. 446/431; 446/437; 446/470
(58) Field of Search .................. 446/6, 93, 94, 446/95, 230, 231, 424–428, 431, 437, 460–466, 457, 468–471; 180/65.1–65.6, 22, 24.02–24.07, 21, 23, 24, 24.08

(56) References Cited

U.S. PATENT DOCUMENTS

| | | | |
|---|---|---|---|
| 481,963 A | 6/1892 | Minor | |
| 962,308 A | 6/1910 | Burnett | |
| 1,305,535 A | 6/1919 | Grabowiecki | |
| 3,253,632 A | 5/1966 | Dalrymple | 152/15 |
| 3,465,843 A | 9/1969 | Guinot | 180/79.3 |
| 3,649,981 A * | 3/1972 | Woodworth | 15/83 |
| 3,746,112 A * | 7/1973 | Ilon | 180/6.2 |
| 3,789,947 A | 2/1974 | Blumrich | 180/79.3 |
| 4,150,508 A * | 4/1979 | Ogawa | 446/34 |
| 4,167,830 A * | 9/1979 | Ogawa | 446/90 |
| 4,206,564 A * | 6/1980 | Ogawa | 446/94 |
| 4,223,753 A * | 9/1980 | Bradbury | 180/6.2 |
| 4,248,006 A * | 2/1981 | Jones et al. | 446/89 |
| 4,313,511 A * | 2/1982 | Soo Hoo | 180/21 |
| 4,335,899 A * | 6/1982 | Hiscock | 280/259 |
| 4,484,646 A * | 11/1984 | Smith | 180/6.2 |
| 4,715,460 A * | 12/1987 | Smith | 180/7.1 |
| 4,739,851 A * | 4/1988 | Perego | 180/65.1 |
| 4,926,952 A * | 5/1990 | Farnam | 180/6.5 |
| D309,254 S | 7/1990 | Guile | D8/375 |
| D318,791 S | 8/1991 | Guile | D8/375 |
| 5,052,680 A * | 10/1991 | Malewicki et al. | 472/137 |
| 5,183,133 A * | 2/1993 | Roy et al. | 180/252 |
| 5,276,942 A | 1/1994 | Estkowski et al. | 16/47 |
| 5,815,885 A | 10/1998 | Chen | 16/47 |
| 5,868,600 A * | 2/1999 | Watanabe | 446/460 |
| D435,437 S | 12/2000 | Guile | D8/375 |
| 6,340,065 B1 * | 1/2002 | Harris | 180/7.2 |
| 6,564,955 B2 * | 5/2003 | Franzen et al. | 212/301 |

* cited by examiner

*Primary Examiner*—Derris H. Banks
*Assistant Examiner*—Faye Francis
(74) *Attorney, Agent, or Firm*—Nixon & Vanderhye PC (57) ABSTRACT

Problems are solved in a conventional traveling structure that can perform only the back and forth movement, circularly back and forth movement, and straight laterally movement, so that every directional movement is desired, and is not suitable for a traveling structure of agricultural equipment desired to be movable in every direction, and also is not enough of a challenge to be a traveling toy. In a traveling structure for traveling by rotating wheels with a driving source such as a motor, the traveling structure comprises a main body, the wheels arranged on every side of the main body, and auxiliary wheels arranged in the wheels rotatably in a direction perpendicular to the rotating direction of the wheels, wherein the auxiliary wheels are protruded from a supporting surface of the wheels.

20 Claims, 10 Drawing Sheets

TRAVELING STRUCTURE

BACKGROUND OF THE INVENTION

1. Field of the Invention

The present invention relates to traveling structures, and in particular relates to a traveling structure being suitable for use as a radio-controlled traveling toy, robot for searching planets, and cultivator, and being capable of traveling back and forth, straight laterally, and back and forth obliquely, and of revolving about one point.

2. Description of the Related Art

There have been conventional traveling structures of such a kind, such as a structure having a pair of caterpillars like a tank, which travels straight back and forth and circularly moves back and forth by driving the caterpillars with respective driving sources, or revolves about one point by driving one of the caterpillars, and a structure having four wheels like an automobile and traveling straight back and forth or circular moving back and forth by driving the one of back and forth wheels or by driving both the back and forth wheels with respective driving sources.

Since such conventional traveling structures can only travel straight back and forth and circularly move back and forth, or revolve about one point, they tend to be dissatisfied as radio-controlled toys. Then, a traveling structure is recently available, which has caterpillars disposed on both sides and auxiliary wheels attached on the central back surface on either side to be able to rise. The traveling structure (traveling toy) advances by rotating both the caterpillars, revolves about one point by rotating only one caterpillar, and further laterally moves by raising and rotating the auxiliary wheels so as to cancel the grounding by the caterpillars.

Such a traveling structure, however, can perform only the back and forth movement, circularly back and forth movement, and straight laterally movement, so that every directional movement is desired. For example, it is not suitable for a traveling structure of agricultural equipment desired to be movable in every direction, and also it is not enough of a challenge to be a traveling toy.

SUMMARY OF THE INVENTION

A traveling structure according to the present invention is to solve the above-mentioned problems, and it is an object of the present invention to provide a traveling structure capable of obliquely traveling as well as the back and forth moving, straight laterally moving, and revolving about one point.

In accordance with a first aspect of the present invention, in a traveling structure for traveling by rotating wheels with a driving source such as a motor, the traveling structure comprises a main body, the wheels arranged on every side of the main body, and auxiliary wheels arranged in the wheels rotatably in a direction perpendicular to the rotating direction of the wheels, wherein the auxiliary wheels are protruded from a supporting surface of the wheels.

In accordance with a second aspect of the present invention, in a traveling structure for traveling by rotating wheels with a driving source such as a motor, the traveling structure comprises a main body, the wheels arranged on every side of the main body, and auxiliary wheels arranged in the wheels rotatably in a direction perpendicular to the rotating direction of the wheels, wherein the auxiliary wheels are protruded from a supporting surface of the wheels, and wherein a suspension effect of absorbing unevenness on a traveling road is imparted to the wheels.

Preferably, the wheels are attached to ends of legs extended from four sides of the main body; at least one pair of the legs comprise two legs; and the structure further comprises a drive member attached to an end of each of the legs, and a reducer gear train accommodated in the driving member, wherein the driving source is accommodated in the drive member, and wherein a driving force is transmitted to each of the wheels via the reducer gear train.

Preferably, the structure further comprises a reducer gear train, wherein the driving source and the reducer gear train are accommodated in each of the legs and a driving force is transmitted to each of the wheels via the reducer gear train; and the drive member comprises a fixing member attached to each of the legs and a movable member rotatably attached to the fixing member, and the driving source and the reducer gear train are accommodated in the movable member while a suspension is interposed between the fixing member and the movable member.

Preferably, each of the legs is longitudinally divided into two parts having a suspension interposed therebetween; and the auxiliary wheels accommodated in each of the wheels are arranged in a single column in a circumferential direction.

Preferably, the auxiliary wheels accommodated in each of the wheels are arranged in a double column, in a staggered configuration, and in a circumferential direction; and the structure is a radio-controlled traveling toy.

According to the present invention, as described above, in a traveling structure for traveling by rotating wheels with a driving source such as a motor, the traveling structure comprises a main body, the wheels arranged on every side of the main body, and auxiliary wheels arranged in the wheels rotatably in a direction perpendicular to the rotating direction of the wheels, wherein the auxiliary wheels are protruded from a supporting surface of the wheels, so that the structure is capable of back and forth, laterally, and obliquely traveling as well as of revolving about one point. Therefore, when being used for a toy, the structure becomes attractive for players by increasing a game fascinating range. When the structure is also used for a vehicle such as a cultivator, the auxiliary wheels securely bite into a soft road, facilitating farming operations, and furthermore, the vehicle can be moved laterally when being stopped, enabling the cultivator to be easily treated.

By imparting the suspension effect to the wheels, the vehicle travels following even the unevenness on a road, so that it may not be stacked, while being able to securely travel in a desired direction because the wheels cannot float on an uneven road.

BRIEF DESCRIPTION OF THE DRAWINGS

FIG. 2A is a rear elevational view, FIG. 2B is a side view, and FIG. 2C is a plan view of a drive member of the traveling structure;

FIG. 3A is a rear elevational view, FIG. 3B is a side view, and FIG. 3C is a plan view of an internal mechanism of the traveling structure;

DESCRIPTION OF THE PREFERRED EMBODIMENTS

A teleoperated traveling structure according to an embodiment of the present invention will be described below with reference to the drawings.

Figure 1:
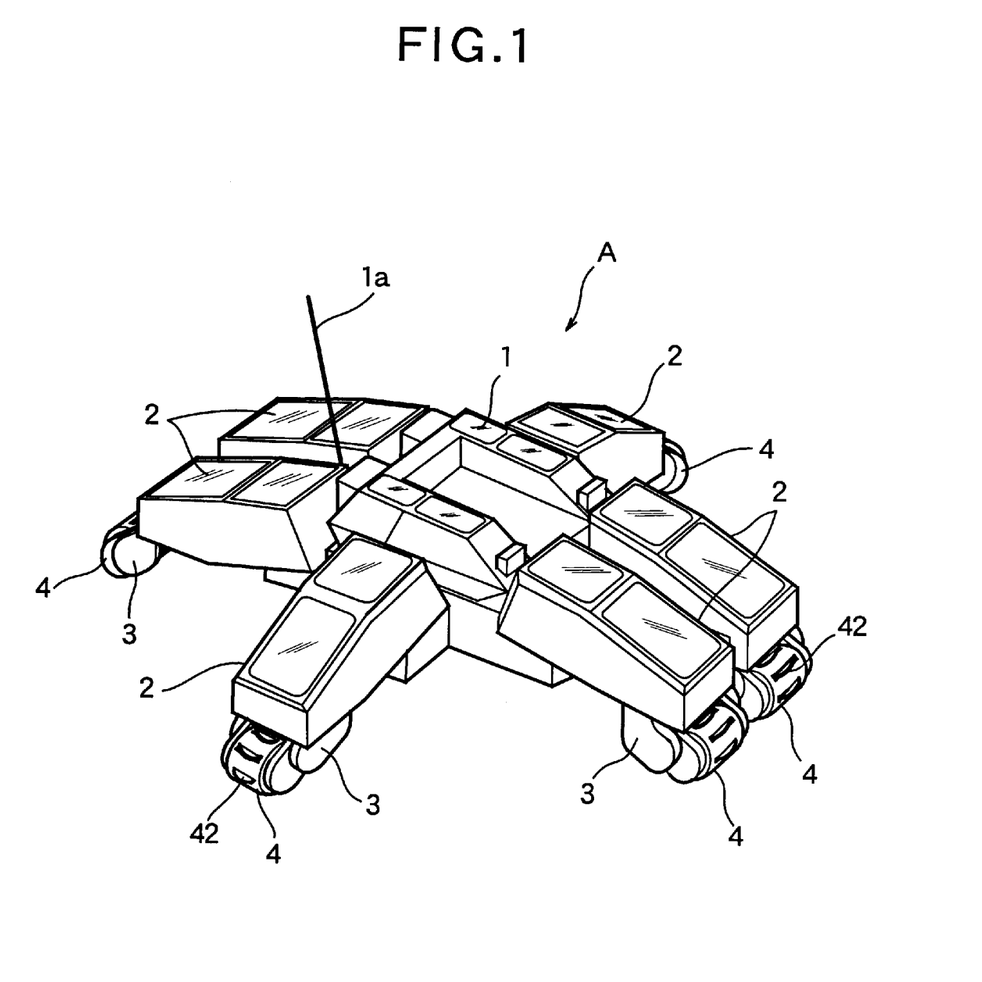
FIG. 1 is a perspective view of a traveling structure according to a first embodiment of the present invention.
Figure 2:
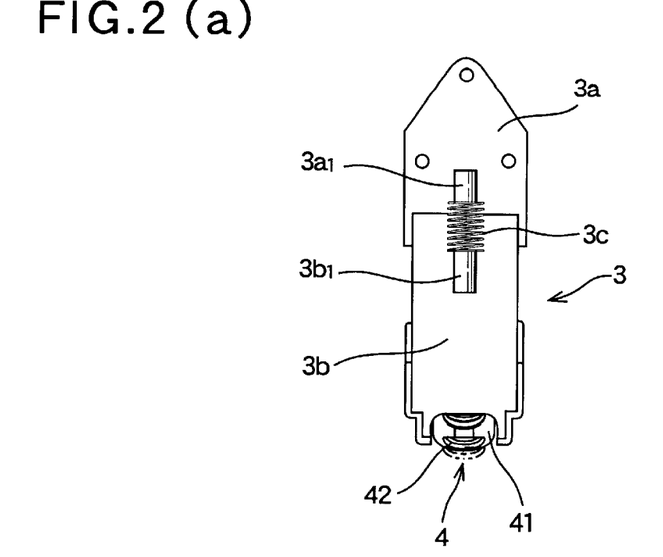

FIG. 1 is an overall view of a traveling structure A, and a body 1 is provided with a receiver for receiving radio waves from a transmitter and a battery or fuel for driving the receiver and a driving source such as a motor and engine, which will be described later, embedded therein. In addition, numeral 1a denotes an antenna connected to the receiver.

Six legs 2 are formed integrally with the body 1, and two legs 2 are formed in each of the back-and-forth directions of the body 1 and one leg 2 in each of the right and left thereof. Each leg 2 is provided with a drive member 3 attached at the end.

Figure 3:
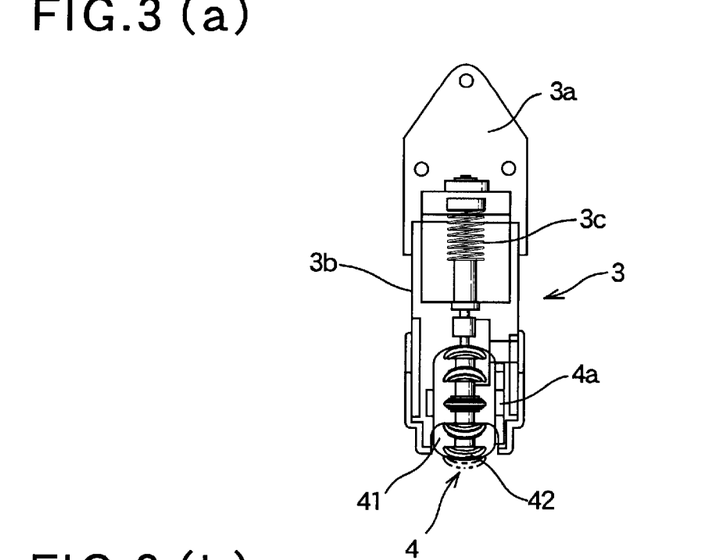
Figure 4:
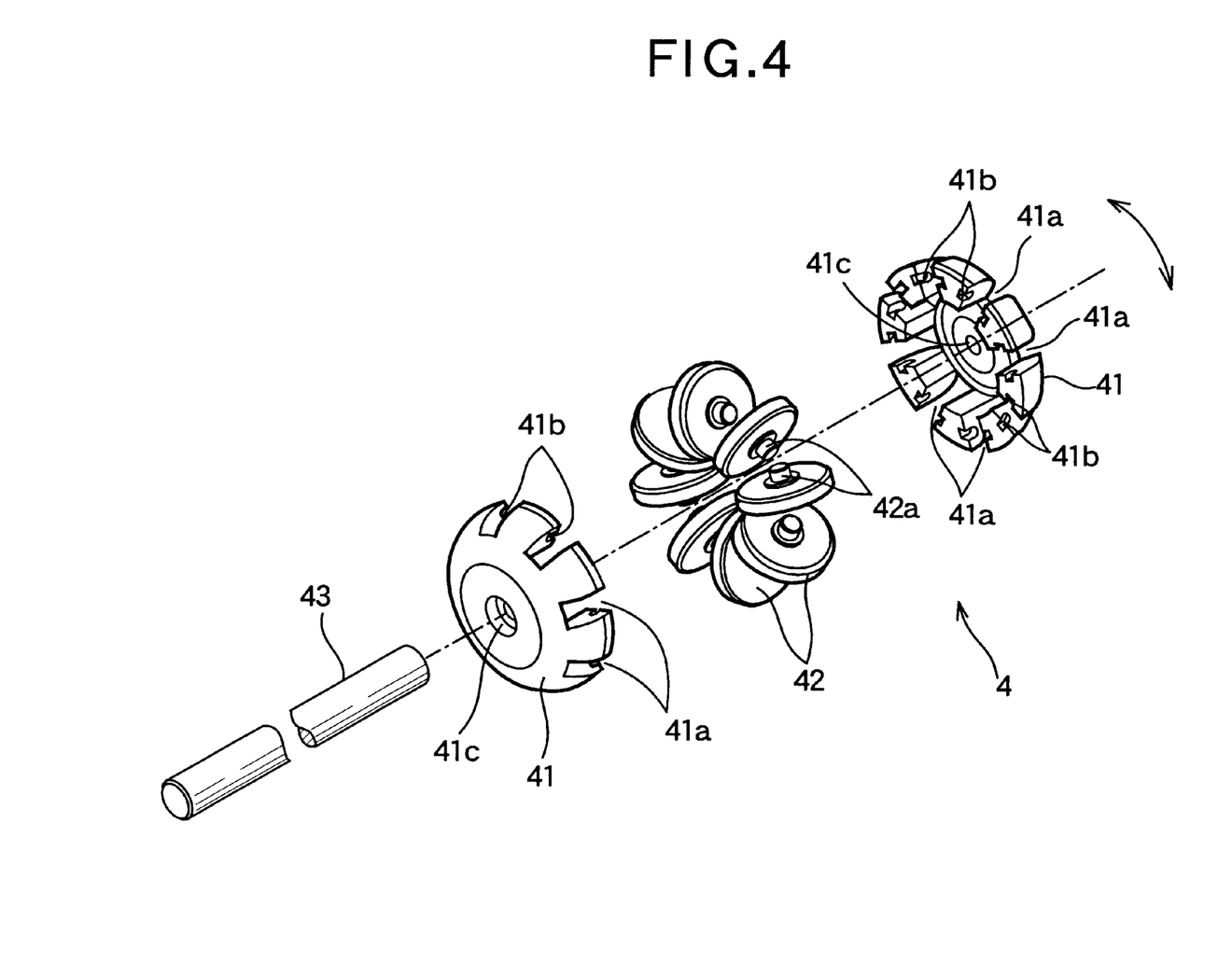
FIG. 4 is an assembly view of a wheel.

The drive member 3, as shown in FIGS. 2A to 2C and FIGS. 3A to 3C, comprises a fixing member 3a attached at the end of the leg 2, an L-shaped movable member 3b journaled on bearings to the fixing member 3a, a spring 3c which is a suspension lying between projections $3a_1$ and $3b_1$ respectively protruded from sides of the fixing member 3a and the movable member 3b, a motor 3d built in the movable member 3b, and a two-stage reducer gear train 3e. A wheel 4, which will be described in detail with reference to FIG. 4, is rotatably journaled on bearings to the lower end of the movable member 3b to rotate by the driving power of the motor 3d via the reducer gear train 3e. The case of the motor as the driving source will be described below; however, an engine may of course be utilized instead of the motor.

Next, the motor 3d and reducer gear train 3e will be described in detail. The motor 3d is embedded in the upper part of the movable member 3b, and a bevel gear $3e_1$, of the reducer gear train 3e, which is meshed with a gear (not shown) attached to a rotational shaft of the motor 3d, is journaled on bearings to the movable member 3b. A gear $3e_2$ formed integrally with the bevel gear $3e_1$, is meshed with a spur gear $3e_3$ rotatably journaled on bearings to the same movable member 3b. A gear $3e_4$ formed integrally with the spur gear $3e_3$ is also meshed with a spur gear 4a attached to the wheel 4.

In the drive member 3 configured as described above, the driving of the motor 3d rotates the spur gear 4a via the reducer gear train 3e, so that the wheel 4 is rotated. The rotational direction of the wheel 4 of course changes depending on the direction of the motor 3d.

Then, the wheel 4 will be described in detail with reference to FIG. 4.

The wheel 4 comprises a pair of auxiliary-wheel carriers 41, a plurality of auxiliary wheels 42 (eight in the drawing), and one axle shaft 43. The opposing surface of each auxiliary-wheel carrier 41 is provided with a plurality of grooves 41a, into which the auxiliary wheels 42 are inserted, and bearings 41b for journaling shafts 42a of the auxiliary wheels 42 formed therein.

A through-hole 41c is formed in the center of each auxiliary-wheel carrier 41, and the axle shaft 43 is inserted into and stuck to the through-holes 41c. Although not shown, on one side of one of the auxiliary-wheel carriers 41 (the right auxiliary-wheel carrier 41 in FIG. 4), the spur gear 4a is fixed, which in turn is meshed with the gear $3a_4$ of the reducer gear train 3e.

In the wheel 4 configured as described above, when a rotational force is applied in the arrow directions in FIG. 4, the wheel 4 is movable in the rotational direction by the frictional force between the auxiliary wheels 42 and a supporting surface. On the other hand, when a moving force is applied in the direction parallel to the axle shaft 43, the auxiliary wheels 42 become a state of idle running, so that the structure is smoothly movable in the direction perpendicular to the arrow directions.

When there are depressions on a traveling way, the wheel 4 may be put into a state of not grounding. In this case, however, to the movable member 3b, which is axially connected to the fixing member 3a with the spring 3c therebetween, a rotational force is applied by the spring 3c clockwise when viewing in FIG. 2B. Therefore, the wheel 4 is urged by the spring in the grounding direction so as not to float on the traveling way.

Next, a second embodiment will be described with reference to FIGS. 5 to 11F.

Figure 5:
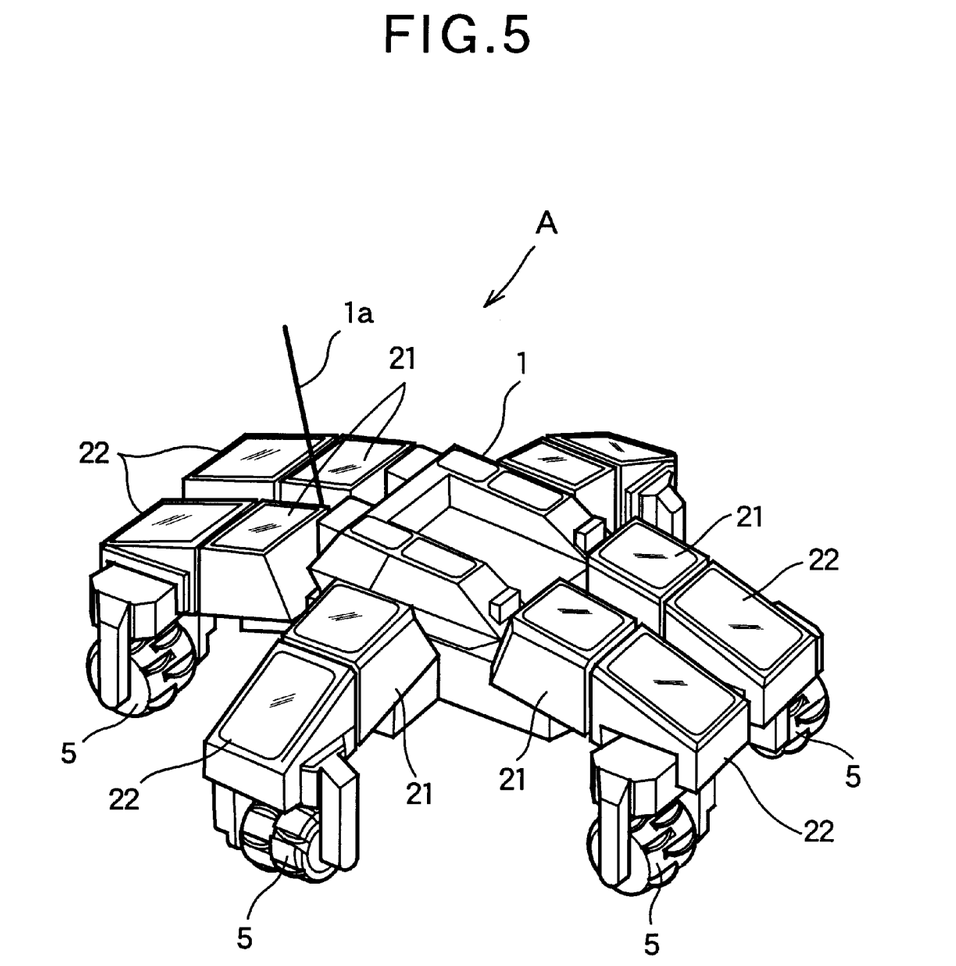
FIG. 5 is a perspective view of a second embodiment.

According to the first embodiment described above, the drive member 3 having a buffer, which is the spring 3c, and the wheel 4 attached thereto is attached to the end of the leg 2; alternatively, according to this embodiment, the leg is divided into a leg 21 and an auxiliary leg 22, and a motor and reducer gear train (both not shown) are embedded into the auxiliary leg 22 while a spur gear (not shown) attached to a wheel 5 is meshed with the final stage of the reducer gear train.

A surface of the leg 21 opposing the auxiliary leg 22 in the upper part is provided with a spring 23 as a suspension, with one end being supported to the leg 21 and the other end to a spring carrier 22a of the auxiliary leg 22, which urges the auxiliary leg 22 by the spring force to rotate the auxiliary leg 22 clockwise. Furthermore, a projection 21a protruded from the leg 21 abuts the back surface of the auxiliary leg 22, so that the auxiliary leg 22 usually maintains the horizontal state relative to the leg 21.

Figure 6:
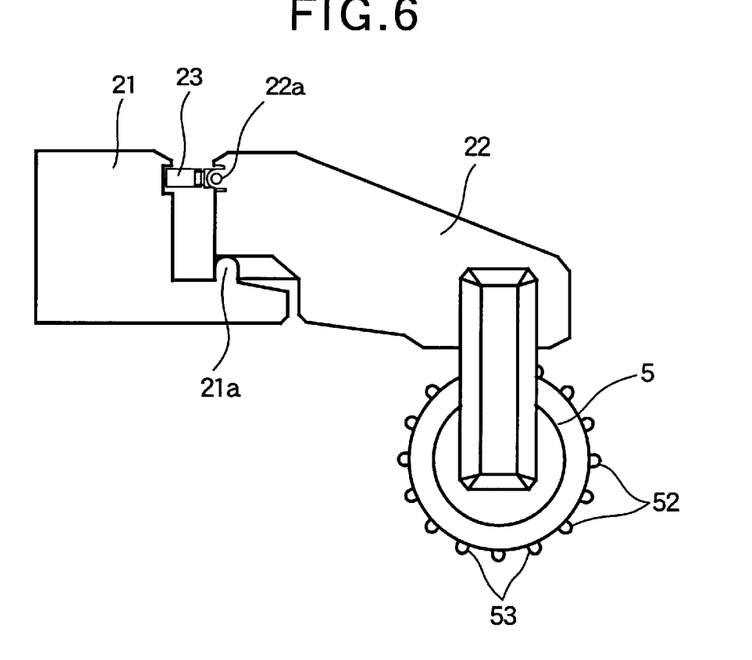
FIG. 6 is a side view showing a drive member of the second embodiment in a state located on a flat road.
Figure 7:
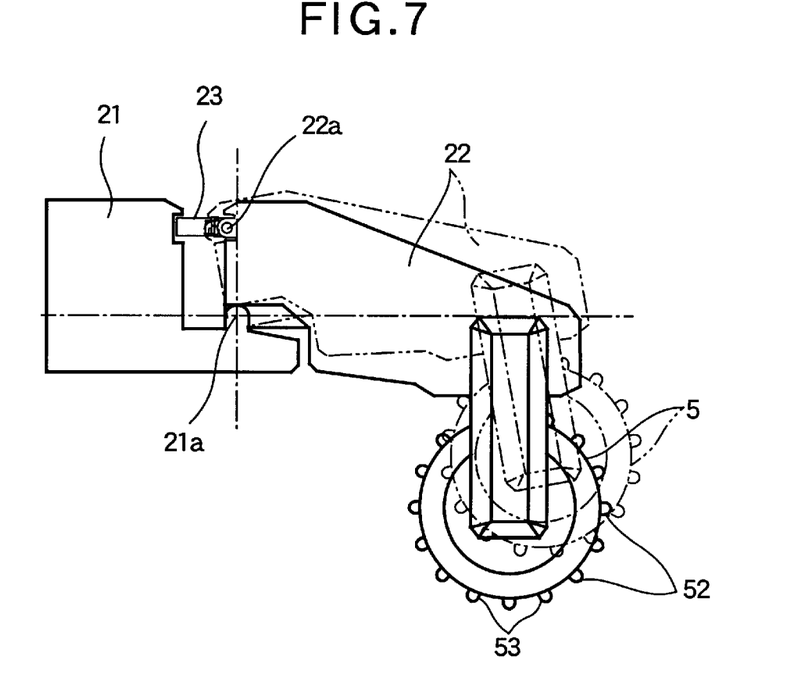
FIG. 7 is a side view showing the drive member of the second embodiment when the road has projections.

Therefore, while the auxiliary leg 22 maintains the horizontal state relative to the leg 21, as shown in FIG. 6, when the traveling structure A travels on a flat way, when there are depressions on the traveling way, the auxiliary leg 22 is rotated counterclockwise against the spring force of the spring 23, as shown in FIG. 7; however, when the way becomes flat, the auxiliary leg 22 returns to the horizontal state shown in FIG. 6 by the spring force of the spring 23.

Next, the wheel 5 will be described in detail with reference to FIGS. 8 to 10.

According to the first embodiment described above, the auxiliary wheels 42 are arranged in a single column, so that the traveling structure is liable to slip depending on conditions of the road surface because of small frictional resistance due to the small grounding area in the single column. Then, according to this embodiment, the auxiliary wheels 42 are arranged in a double column so as to increase the grounding area and prevent slippage relative to the road surface from being generated on any road surface.

The wheel 5 comprises an auxiliary-wheel carrier 51, a lateral pair of auxiliary wheels 52 and 53 rotatably journaled on bearings of both sides of the auxiliary-wheel carrier 51, a pair of caps 54 and 55 for preventing the auxiliary wheels 52 and 53 from coming off the auxiliary-wheel carrier 51, and an axle shaft 56 inserted into and fixed to holes 51a, 54a, and 55a of the auxiliary-wheel carrier 51 and the caps 54 and 55.

The both sides of the auxiliary-wheel carrier 51 and the surfaces of the caps 54 and 55 opposing the auxiliary-wheel carrier 51 are provided with a plurality of grooves 51b, 54b, and 55b (in the drawing, the number of wheels of each of the auxiliary wheels 52 and 53 is eight, so that there are eight grooves), into which the auxiliary wheels 52 and 53 are inserted. Also, the auxiliary-wheel carrier 51 is provided with bearings 51c formed for journaling shafts 52a and 53a of the auxiliary wheels 52 and 53 thereon.

Although not shown, on the front surface of any one of the caps 54 and 55, a spur gear to be meshed with the final gear of the reducer gear train accommodated in the auxiliary leg 22 is integrally formed. Also, the grooves and bearings to be inserted by the auxiliary wheels 52 and 53 are formed by displacing their positions so that the auxiliary wheels 52 and 53 are not abutted to each other.

Figure 8:
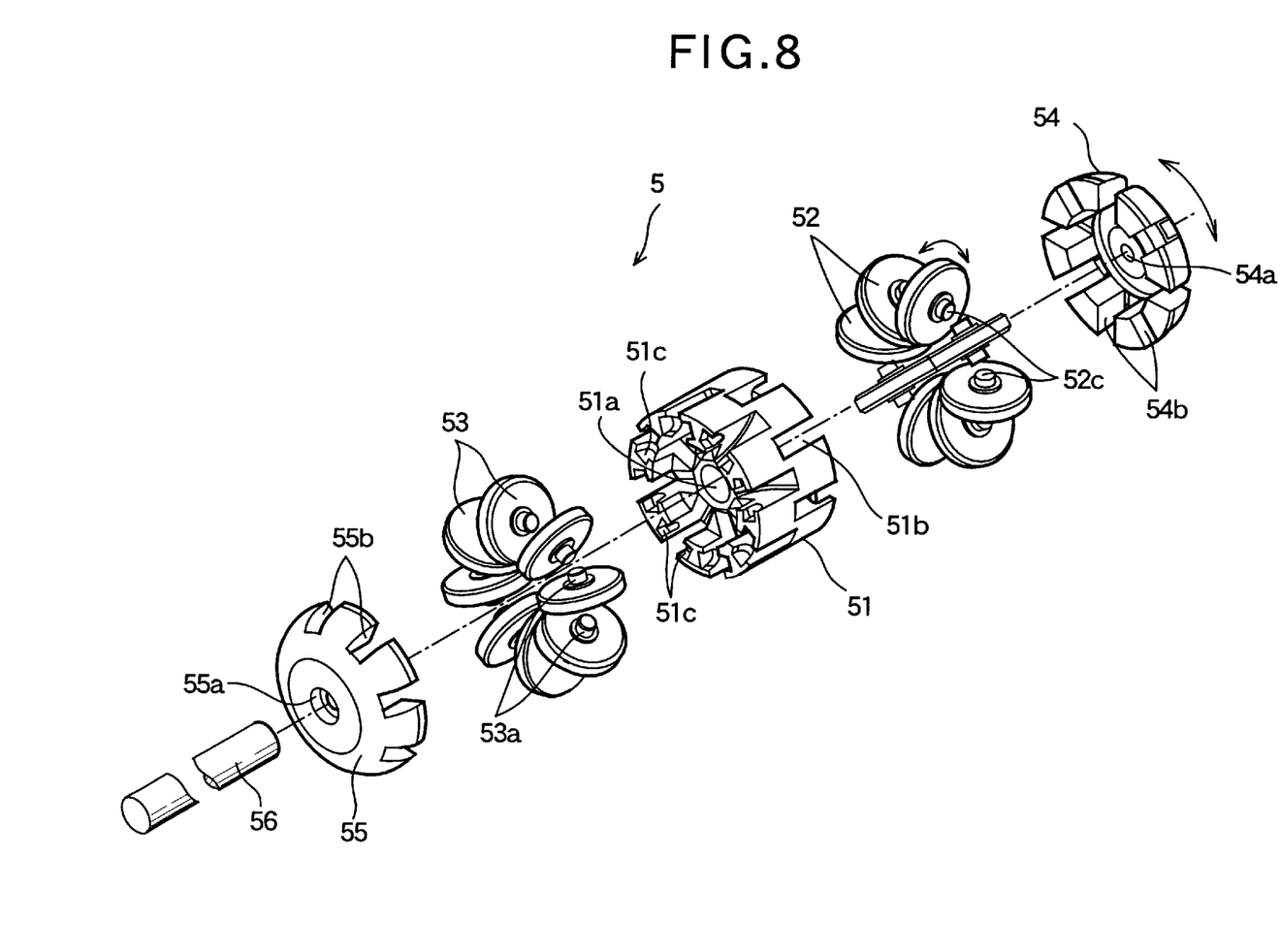
FIG. 8 is an assembly view of a wheel of the second embodiment.
Figure 9:
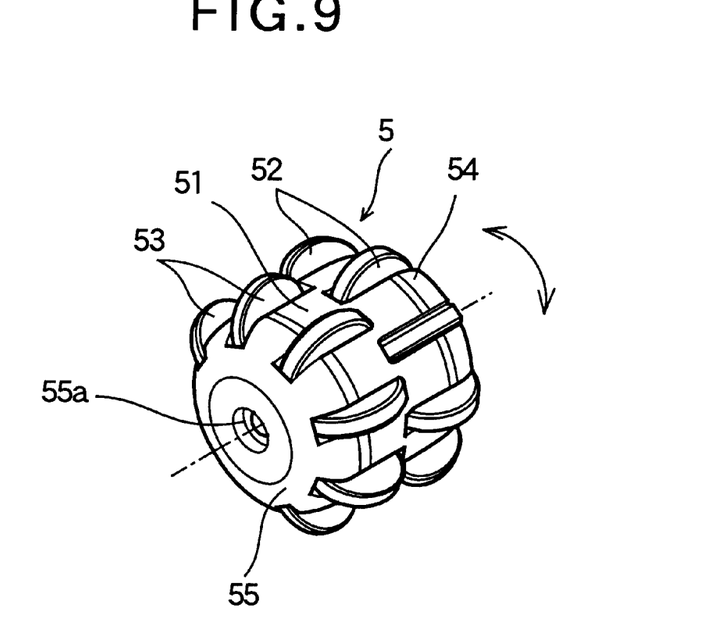
FIG. 9 is a perspective view of the wheel in an assembled state.
Figure 10:
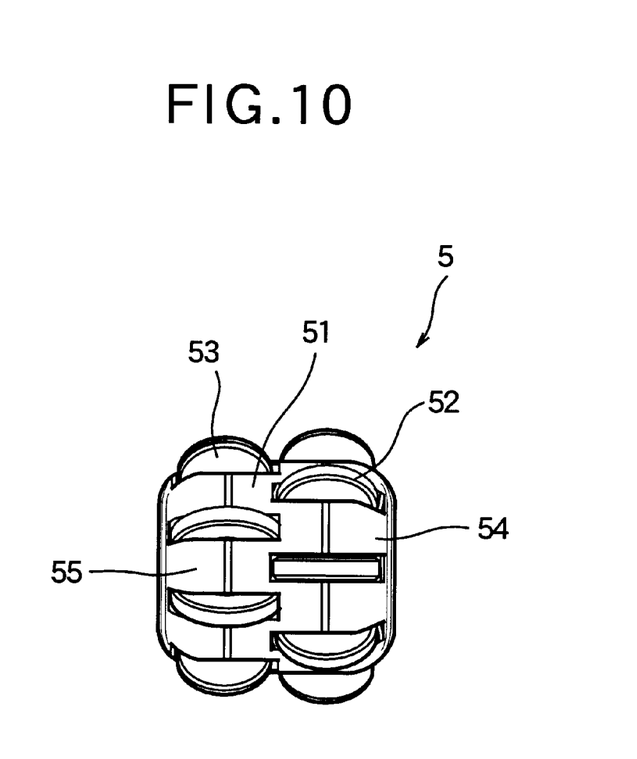
FIG. 10 is a front view of the wheel in the assembled state.
Figure 11:
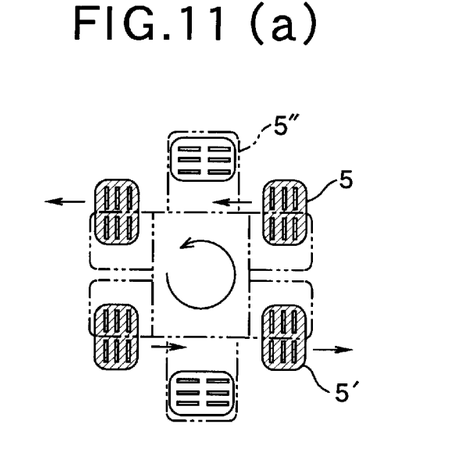
FIGS. 11A to 11F are plan views of a third embodiment showing traveling states.

In the wheel 5 configured as described above, when a rotational force is applied in the arrow directions in FIGS. 8 and 9, the wheel 5 is movable in the rotational direction by the frictional force between the auxiliary wheels 52 and 53 and the supporting surface. On the other hand, when a moving force is applied in the direction parallel to the axle shaft 56, the auxiliary wheels 52 and 53 become a state of idle running, so that the structure is smoothly movable in the direction perpendicular to the arrow directions.

According to the second embodiment, there are provided the two auxiliary wheels 52 and 53, so that the grounding area is increased, enabling the structure to securely travel even when the road is slippery. Furthermore, when there are projections on the traveling road, if one of the wheels 5 floats up, the other may also float from the grounding surface; however, in this case, the leg is divided into the leg 21 and the auxiliary leg 22 while the auxiliary leg 22 being urged by the spring in the grounding direction, so that only the wheel 5 running up onto the projection is independently rotated (see FIG. 7) so as not to affect the other wheel, so that the entire traveling structure A maintains the horizontal state, reducing the effect on the traveling.

Next, the overall operation of the traveling structure A will be described with reference to the schematic views of FIGS. 11A to 11F.

Referring to FIGS. 11A to 11F, the structure is exemplified with the auxiliary wheels 52 and 53 of the wheel 5 aligned to each other; the auxiliary wheels 52 and 53 may be positioned to align each other in such a manner, or they may be located by displacing their positions as in the second embodiment. Moreover, even in the case of one wheel as in the first embodiment, the operation, which will be described, is the same.

The operation is now described below. In addition, in the drawings, to the wheels 5 patterned by hatching, driving forces are applied, and the arrow shows the proceeding direction of each of the wheels 5. For convenience sake, numerals 5, 5', and 5" denote each pair of wheels.

In the case of FIG. 11A, the pairs of wheels 5 and 5' are driven in the opposite direction to each other as shown by the arrows, so that the structure is counterclockwise revolved about one point; in the case of FIG. 11B, the pairs of wheels 5, 5', and 5" are driven in the arrow directions, so that the structure proceeds diagonally upwards in the left; in the case of FIG. 11C, the pairs of wheels 5 and 5' are driven in the arrow direction, so that the structure proceeds straight in the right; in the case of FIG. 11D, the pairs of wheels 5, 5', and 5" are driven in the arrow directions, so that the structure proceeds diagonally upwards in the right; in the case of FIG. 11E, the pairs of wheels 5 and 5' are driven in the arrow direction, so that the structure proceeds straight in the left; and in the case of FIG. 11F, the pair of wheels 5" are driven in the arrow direction, so that the structure proceeds straight upwards.

Although not shown in FIGS. 11A to 11F, in the case of FIG. 11A, by reversing the driving direction of the pairs of wheels 5 and 5', the structure is clockwise revolved about one point; in the case of FIG. 11F, when the pair of wheels 5" are driven in the direction opposite to the arrow, the structure proceeds straight downwards. Furthermore, in the case of FIG. 11B, when the pair of wheels 5 are not driven, the pair of wheels 5 are in a free state, so that the structure is clockwise revolved largely; in the case of FIG. 11D, when the pair of wheels 5' are not driven, the pair of wheels 5' are in a slippery state, so that the structure is counterclockwise revolved largely.

As described above, in the traveling structure according to the present invention, there are provided the three pairs of wheels 5, and each of the pairs of wheels 5, 51, and 5" is provided with the auxiliary wheels. The structure is rotatable in a free state in the direction perpendicular to the rotational directions of the pairs of wheels 5, 5', and 5", so that the structure is rotatable in every direction while being able to revolve about one point.

Next, another embodiment shown in FIGS. 12A to 12E will be described, wherein the wheels 4 disclosed in the first embodiment are arranged at four corners of the main body 1 with drive members therebetween, although which are not shown. According to this embodiment, to the wheels 4 patterned by hatching, driving forces are also applied, and the arrow shows the proceeding direction of each of the wheels 4. For convenience sake, numerals 4 and 4' denote each pair of wheels.

Figure 12A:
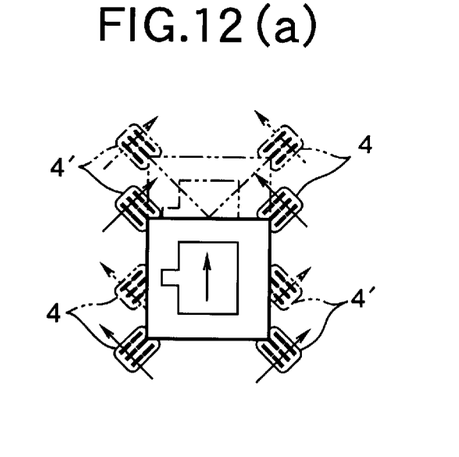
FIGS. 12A to 12E are plan views of a fourth embodiment showing traveling states.
Figure 12B:
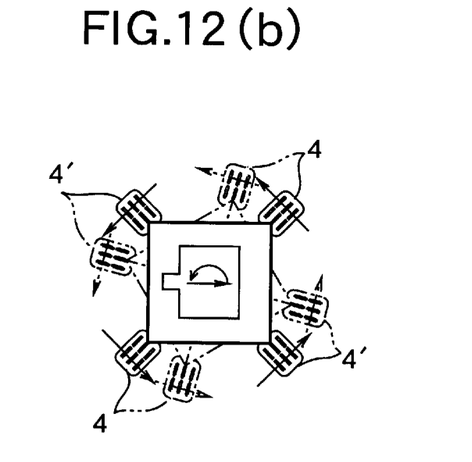
Figure 12C:
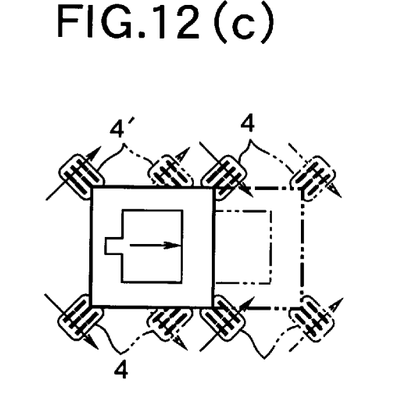
Figure 12D:
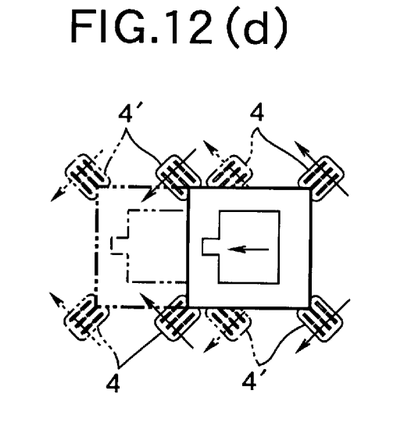
Figure 12E:
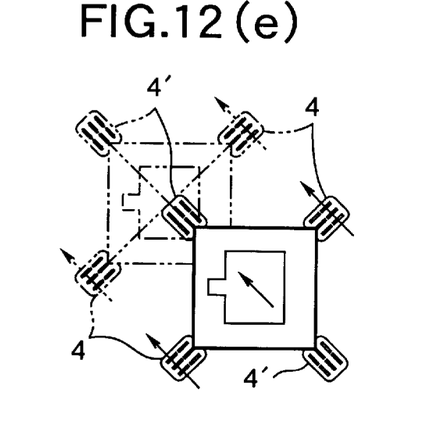

In the case of FIG. 12A, the pairs of wheels 4 and 4' are driven in the respective arrow directions, so that the structure proceeds straight upward; in the case of FIG. 12B, the pairs of wheels 4 and 4' are driven in the different directions as shown by the arrows, so that the structure is counterclockwise revolved about one point; in the case of FIG. 12C, the pairs of wheels 4 and 4' are driven in the respective arrow directions, so that the structure proceeds straight in the right; in the case of FIG. 12D, the pairs of wheels 4 and 4' are driven in the directions opposite to the directions in the case of FIG. 12C, so that the structure proceeds straight in the left; and in the case of FIG. 12E, only the pair of wheels 4 are driven, so that the structure proceeds diagonally upwards in the left.

Although not shown in FIGS. 12A to 12E, in the case of FIG. 12A, by reversing the driving direction of the pairs of wheels 4 and 4', the structure proceeds straight downwards; in the case of FIG. 12B, by reversing the driving direction of the pairs of wheels 4 and 4', the structure is clockwise revolved about one point; and in the case of FIG. 12E, when only the pair of wheels 4 are driven, the structure proceeds diagonally upwards in the right.

Also, according to this embodiment, in the same way as in the embodiment shown in FIGS. 11A to 11F, each of the pairs of wheels 4 and 4' is provided with the auxiliary wheels. The structure is rotatable in a free state in the direction perpendicular to the rotational direction of the pair of wheels 4, so that the structure is rotatable in every direction while being able to revolve about one point.

What is claimed is:

1. A traveling structure comprising:
   a main body;
   a crosswise pair of legs attached to said main body;
   a plurality of traveling wheels rotatably mounted to respective ends of said legs so that the wheels are arranged on every side of the main body for supporting the main body to allow for rolling movement along a traveling surface; and
   a plurality of driving sources each being operatively coupled to a respective one of said traveling wheels for independently driving each of said traveling wheels to thereby cause the main body to be propelled along a surface; wherein
      each of said traveling wheels has a circumferential supporting surface, and includes a plurality of auxiliary disc-shaped wheels freely rotatably mounted to respective ones of said traveling wheels in circumferential spaced-apart relationship relative to the supporting surface of the traveling wheels so that a portion of each said disc-shaped wheel protrudes from a said supporting surface and engages the traveling surface along which the main body travels.

2. A traveling structure as in claim 1, further comprising:
   a suspension for said traveling wheels for absorbing unevenness on a traveling road is imparted to the wheels.

3. A structure according to claim 2, wherein the wheels are attached to ends of legs extended from four sides of the main body.

4. A structure according to claim 2, wherein the auxiliary wheels accommodated in each of the wheels are arranged in a single column in a circumferential direction.

5. A structure according to claim 2, wherein the auxiliary wheels accommodated in each of the wheels are arranged in a double column, in a staggered configuration, and in a circumferential direction.

6. A structure according to claim 2, wherein the structure is a radio-controlled traveling toy.

7. A structure according to claim 1, wherein the wheels are attached to ends of legs extended from four sides of the main body.

8. A structure according to claim 7, wherein at least one pair of the legs comprise two legs.

9. A structure according to claim 8, further comprising:
   a drive member attached to an end of each of the legs; and
   a reducer gear train accommodated in the driving member,
   wherein the driving source is accommodated in the drive member, and
   wherein a driving force is transmitted to each of the wheels via the reducer gear train.

10. A structure according to claim 8, further comprising a reducer gear train, wherein the driving source and the reducer gear train are accommodated in each of the legs and a driving force is transmitted to each of the wheels via the reducer gear train.

11. A structure according to claim 7, further comprising;
    a drive member attached to an end of each of the legs; and
    a reducer gear train accommodated in the drive member,
    wherein the driving source is accommodated in the drive member, and
    wherein a driving force is transmitted to each of the wheels via the reducer gear train.

12. A structure according to claim 11, wherein the drive member comprises a fixing member attached to each of the legs and a movable member rotatably attached to the fixing member, and the driving source and the reducer gear train are accommodated in the movable member while a suspension is interposed between the fixing member and the movable member.

13. A structure according to claim 7, further comprising a reducer gear train, wherein the driving source and the reducer gear train are accommodated in each of the legs and a driving force is transmitted to each of the wheels via the reducer gear train.

14. A structure according to claim 13, wherein each of the legs is longitudinally divided into two parts having a suspension interposed therebetween.

15. A structure according to claim 1, wherein the auxiliary wheels accommodated in each of the wheels are arranged in a single column in a circumferential direction.

16. A structure according to claim 1, wherein the auxiliary wheels accommodated in each of the wheels are arranged in a double column, in a staggered configuration, and in a circumferential direction.

17. A structure according to claim 1, wherein the structure is a radio-controlled traveling toy.

18. A traveling structure for traveling by rotating wheels with a driving source such as a motor, the traveling structure comprising:
    a main body;
    the wheels arranged on every side of the main body; and
    auxiliary wheels arranged in the wheels rotatably in a direction perpendicular to the rotating direction of the wheels,
    wherein the auxiliary wheels protrude from a supporting surface of the wheels, wherein
       the wheels are attached to ends of legs extended from four sides of the main body, and wherein
       at least one pair of the legs comprise two legs.

19. A traveling structure for traveling by rotating wheels with a driving source such as a motor, the traveling structure comprising:
    a main body;
    the wheels arranged on every side of the main body; and
    auxiliary wheels arranged in the wheels rotatably in a direction perpendicular to the rotating direction of the wheels,
    a drive member attached to an end of each of the legs; and
    a reducer gear train accommodated in the drive member,
    wherein the driving source is accommodated in the drive member, and
    wherein a driving force is transmitted to each of the wheels via the reducer gear train, wherein
       the auxiliary wheels protrude from a supporting surface of the wheels, and wherein
       the wheels are attached to ends of legs extended from four sides of the main body, and wherein the drive member comprises a fixing member attached to each of the legs and a movable member rotatably attached to the fixing member, and the driving source and the reducer gear train are accommodated in the movable member while a suspension is interposed between the fixing member and the movable member.

20. A traveling structure for traveling by rotating wheels with a driving source such as a motor, the traveling structure comprising:

a main body;

the wheels arranged on every side of the main body;

auxiliary wheels arranged in the wheels rotatably in a direction perpendicular to the rotating direction of the wheels, and a reducer gear train, wherein the driving source and the reducer gear train are accommodated in each of the legs and a driving force is transmitted to each of the wheels via the reducer gear train, wherein the auxiliary wheels protrude from a supporting surface of the wheels, wherein the wheels are attached to ends of legs extended from four sides of the main body, and wherein each of the legs is longitudinally divided into two parts having a suspension interposed therebetween.

* * * * *